United States Patent
Converse et al.

(10) Patent No.: US 10,403,918 B2
(45) Date of Patent: Sep. 3, 2019

(54) HEATED CATALYTIC OXIDIZER FOR AN ENCLOSED HUMID ENVIRONMENT

(71) Applicant: Hamilton Sundstrand Corporation, Charlotte, NC (US)

(72) Inventors: David G. Converse, Hampden, MA (US); Ping Yu, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 159 days.

(21) Appl. No.: 15/611,188

(22) Filed: Jun. 1, 2017

(65) Prior Publication Data

US 2018/0351187 A1  Dec. 6, 2018

(51) Int. Cl.

| | |
|---|---|
| H01M 8/06 | (2016.01) |
| H01M 8/22 | (2006.01) |
| H01M 8/0662 | (2016.01) |
| B63G 8/08 | (2006.01) |
| H01M 8/04029 | (2016.01) |
| H01M 8/04223 | (2016.01) |
| B63G 8/00 | (2006.01) |

(52) U.S. Cl.
CPC ............ *H01M 8/0662* (2013.01); *B63G 8/08* (2013.01); *H01M 8/04029* (2013.01); *H01M 8/04231* (2013.01); *H01M 8/22* (2013.01); *B63G 2008/002* (2013.01); *H01M 2250/20* (2013.01); *H01M 2250/405* (2013.01)

(58) Field of Classification Search
None
See application file for complete search history.

(56) References Cited

U.S. PATENT DOCUMENTS

| | | | |
|---|---|---|---|
| 3,664,873 A | 5/1972 | Buswell et al. | |
| 6,794,070 B2 | 9/2004 | Amrhein et al. | |
| 2005/0019633 A1* | 1/2005 | Tanaka | F23C 13/00 429/437 |
| 2007/0024234 A1* | 2/2007 | Potter | B63G 8/001 320/104 |
| 2009/0176135 A1 | 7/2009 | Saito et al. | |
| 2014/0255733 A1 | 9/2014 | Masset et al. | |

FOREIGN PATENT DOCUMENTS

EP   1501149 A2   1/2005

OTHER PUBLICATIONS

European Search Report for EP Application No. 18174798.1 dated Aug. 7, 2018.

* cited by examiner

*Primary Examiner* — Scott J. Chmielecki
(74) *Attorney, Agent, or Firm* — Carlson, Gaskey & Olds, P.C.

(57) ABSTRACT

A system has a fuel cell. The fuel cell has a source of hydrogen and a source of oxygen containing gas. The hydrogen is connected for passage across the anode. The source of oxygen containing gas is connected to pass across a cathode. The fuel cell produces electricity. A catalytic oxidizer oxidizes hydrogen within the system. A cooling water circuit passes across cooling water passages in the fuel cell and cools the cathode. Cooling water downstream of the cooling water passages passes across the catalytic oxidizer to heat the catalytic oxidizer. An enclosed vehicle is also disclosed.

15 Claims, 1 Drawing Sheet

HEATED CATALYTIC OXIDIZER FOR AN ENCLOSED HUMID ENVIRONMENT

STATEMENT REGARDING FEDERALLY SPONSORED RESEARCH OR DEVELOPMENT

This invention was made with government support under Contract No. N00014-12-D-0372-0001, awarded by the United States Navy. The Government has certain rights in this invention.

BACKGROUND OF THE INVENTION

This application relates to a fuel cell system operated in an enclosed environment.

A fuel cell is a device that converts chemical energy of a fuel into electrical energy, typically by oxidizing the fuel. In general, a fuel cell includes an anode and a cathode which are catalyst layers on opposite sides of an electrolytic membrane. When fuel is supplied to the anode and oxidant is supplied to the cathode, the membrane assembly generates a useable electric current that is passed through an external load. In one widely used type of fuel cell, the fuel supplied is hydrogen and the oxidant supplied is oxygen. In such cells, the electrolyte combines the oxygen and hydrogen to form water and to release electrons.

One environment which may benefit from the use of a fuel cell is an enclosed environment such as an unmanned, underwater vehicle. In such a vehicle, it is important to eliminate any gases escaping the vehicle. Thus, waste hydrogen and oxygen along with waste water, which is a product of the operation of fuel cells, cannot be delivered outwardly of the vehicle. This is not an issue with a fuel cell used, as an example, on a land vehicle.

In addition, in operating a fuel cell, it is desirable to periodically purge both the anode and cathode to remove built up impurities. This is typically done by passing hydrogen and oxygen across the anode and cathode, respectively, and into an environment within the underwater vehicle.

However, these gases cannot be left untreated within the environment. Thus, it is known to provide a catalytic oxidizer within the vehicle. Known catalytic oxidizers are operable to remove the hydrogen, such as by combining it with oxygen to create water.

Within the interior of an underwater vehicle, humidity can become high. In addition, there tends to be a good deal of free water due to the operation of the fuel cell.

When the underwater vehicle is within a body of water, the ambient water outwardly of the vehicle can be at low temperatures. This can cause further condensation of the water within the vehicle.

If the catalytic oxidizer is exposed to undue amounts of water, and/or high humidity, its reactivity can be compromised.

SUMMARY OF THE INVENTION

A system has a fuel cell. The fuel cell has a source of hydrogen and a source of oxygen containing gas. The hydrogen is connected for passage across the anode. The source of oxygen containing gas is connected to pass across a cathode. The fuel cell produces electricity. A catalytic oxidizer oxidizes hydrogen within the system. A cooling water circuit passes across cooling water passages in the fuel cell and cools the cathode. Cooling water downstream of the cooling water passages passes across the catalytic oxidizer to heat the catalytic oxidizer.

An enclosed vehicle is also disclosed.

These and other features may be best understood from the following drawings and specification.

DETAILED DESCRIPTION

Figure 1:
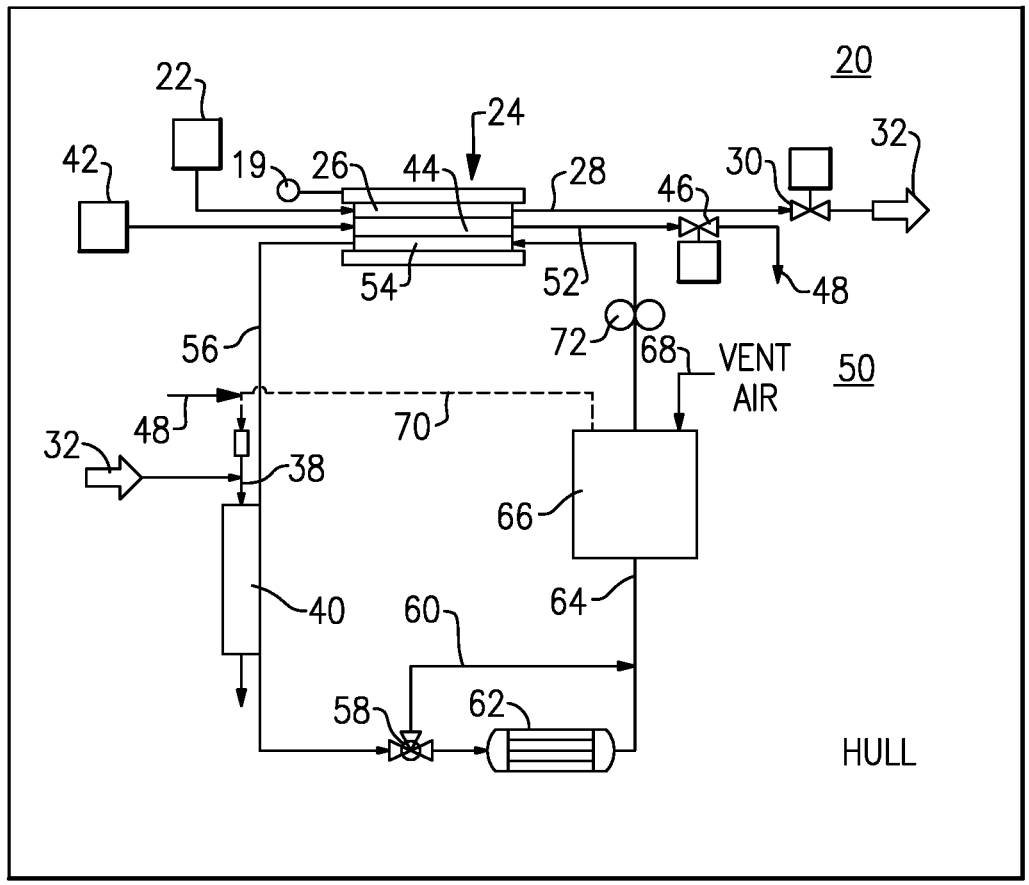
FIG. 1 schematically shows an underwater vehicle including a fuel cell and catalytic oxidizer system.

FIG. 1 shows a vehicle 20 which may be an underwater, unmanned vehicle. Tank 22 contains a source of hydrogen associated with a fuel cell 24. Hydrogen gas passes across an anode 26 and to an outlet 28. Alternatively, the hydrogen may simply be delivered back to an inlet line to the anode 26.

Downstream of the line 28 is a valve 30 controlling flow to a purge line 32.

Tank 42 is a source of oxygen containing gas, which may be air, but is more likely a gas containing a higher percentage of oxygen than air. The gas is passed across a cathode 44. Line 52 also leads to a valve 46 and a purge line 48.

The fuel cell 24 contains other components, as known, and operates to generate electricity for a use, or uses, 19.

The valves 30 and 46 are periodically opened to bring reactant gas across the anode and cathode, respectively, to remove impurities.

A cooling water chamber or passages 54 cool the cathode 44. A tank 62 delivers cooling water to a line 64 into an accumulator 66. A pump 72 drives the cooling water across cooling water channels 54 and to a return line 56. As can be appreciated, the water will be heated in the channels 54. The water and return line 56 passes through a catalytic oxidizer 40.

As illustrated, the hydrogen purge line 32 is delivered into a treatment gas line 38 leading into a catalytic oxidizer 40.

A catalytic oxidizer is a chemical reactor packed with granules or pellets, or is a monolith catalyst that contains at least one active noble metal (such as gold, palladium, platinum, iridium, rhodium, etc., or their alloy compounds), which is supported on a porous metal oxide structure such as alumina, titanium oxide, silica, zirconium oxide, cerium oxide, etc.

The hydrogen treatment gas from line 38 and oxygen or air from line 48 passes through the catalyst bed and react with each other on the catalyst's surface. Hydrogen is oxidized to form water. Water is vaporized into the gas stream by the reaction heat or by external heat, or it is condensed on the catalyst pore structure if not enough heat is provided. Condensed water imposes mass transfer resistance to incoming reaction gases and reduces the catalytic activity.

The same may be true for the oxygen purge line 48. The gases in line 38 are maintained separate from the heated cooling water in line 56. The heated cooling water in line 56 heats the catalytic oxidizer 40, thus providing higher catalytic activity by reducing the condensation, relative humidity, and water contact problems as mentioned above.

The use of the heated water reduces the relative humidity of the reactant gases in the catalytic oxidizer below 100%.

In addition, the accumulator 66 may be provided with an air vent 68, which will vent in gases from the interior 50. The vented gases pass through a line 70 and mix into the line 38 passing across the catalytic oxidizer 40. Thus, the catalytic oxidizer 40 will receive several sources of gas to be treated.

Figure 2:
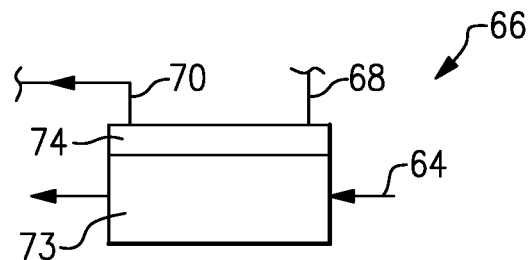
FIG. 2 shows a detail of an accumulator.

FIG. 2 shows a detail of the accumulator 66. As shown, there is an inlet vent line 68 and an outlet line 70. The vent 68 fills a gas space 74 within the accumulator 66 and that gas is driven to the outlet line 70. The cooling water 73 is vertically below this gas.

This disclosure thus provides more efficient operation of a catalytic oxidizer especially when utilized in an enclosed environment that has exposure to water and relatively high humidity. This is particularly valuable in unmanned vehicles, such as utilized underwater.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
a fuel cell having a source of hydrogen and a source of oxygen containing gas;
said source of hydrogen being connected for passage across said anode;
said source of oxygen containing gas being connected for passage across a cathode;
said fuel cell for producing electricity;
a catalytic oxidizer for oxidizing hydrogen within said system; and
a cooling water circuit for passing across passages in said fuel cell and for cooling said cathode, cooling water downstream of said cooling water passages passing across said catalytic oxidizer to heat said catalytic oxidizer;
wherein hydrogen is periodically purged across said anode and purged hydrogen being routed to said catalytic oxidizer for treatment; and
wherein an accumulator includes a gas vent to vent gases from an environment receiving said system and passing said vented gases across said catalytic oxidizer for treatment.

2. The system as set forth in claim 1, wherein said oxygen containing gas is periodically purged across said cathode and purged oxygen is also brought to said catalytic oxidizer for treatment.

3. The system as set forth in claim 2, wherein said purged hydrogen is connected into a line passing directly into a line leading into said catalytic oxidizer.

4. The system as set forth in claim 3, wherein said purged hydrogen is provided with a valve to periodically allow passage of said hydrogen across said anode.

5. The system as set forth in claim 4, wherein said purged oxygen containing gas is provided with a valve to periodically allow passage of purge oxygen containing gas across said cathode.

6. The system as set forth in claim 1, wherein said accumulator is part of a supply line for said cooling water to said passages.

7. The system as set forth in claim 1, wherein said purged hydrogen is connected into a line passing directly into a line leading into said catalytic oxidizer.

8. An enclosed vehicle comprising:
an interior environment, said interior environment receiving a system;
said system including a fuel cell, said fuel cell having a source of hydrogen and a source of oxygen containing gas;
said source of hydrogen being connected for passage across said anode;
said source of oxygen containing gas being connected for passage across a cathode;
said fuel cell for producing electricity;
a catalytic oxidizer for oxidizing hydrogen within said system;
a cooling water circuit for passing across passages in said fuel cell and for cooling said cathode, cooling water downstream of said cooling water passages passing across said catalytic oxidizer to heat said catalytic oxidizer; and
wherein an accumulator includes a gas vent to vent gases from an environment receiving said system and passing said vented gases across said catalytic oxidizer for treatment.

9. The enclosed vehicle as set forth in claim 8, wherein hydrogen is periodically purged across said anode and purged hydrogen being routed to said catalytic oxidizer for treatment.

10. The enclosed vehicle as set forth in claim 9, wherein said oxygen containing gas is periodically passed purged across said cathode and purged oxygen is also brought to said catalytic oxidizer for treatment.

11. The enclosed vehicle as set forth in claim 10, wherein said purged hydrogen is provided with a valve to periodically allow passage of said hydrogen across said anode.

12. The enclosed vehicle as set forth in claim 11, wherein said purged oxygen containing gas is provided with a valve to periodically allow passage of purge oxygen containing gas across said cathode.

13. The enclosed vehicle as set forth in claim 9, wherein purged hydrogen is connected into a line passing directly into a line leading into said catalytic oxidizer.

14. The enclosed vehicle as set forth in claim 8, wherein said accumulator is part of a supply line for said cooling water to said cooling water passages.

15. The enclosed vehicle as set forth in claim 8, wherein said vehicle is an unmanned vehicle for operation under the water.

* * * * *